(12) United States Patent
Chakkirala (10) Patent No.: US 11,689,102 B2
(45) Date of Patent: Jun. 27, 2023

(54) BOOST CONVERTER CIRCUIT WITH FEEDFORWARD PATH FOR IMPROVED LOAD REGULATION

(71) Applicant: QUALCOMM Incorporated, San Diego, CA (US)

(72) Inventor: Subbarao Surendra Chakkirala, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 21 days.

(21) Appl. No.: 17/145,831

(22) Filed: Jan. 11, 2021

(65) Prior Publication Data

US 2022/0224230 A1 Jul. 14, 2022

(51) Int. Cl.
*H02M 3/158* (2006.01)
*H02M 1/00* (2006.01)
*H02M 3/157* (2006.01)
*H04R 3/00* (2006.01)

(52) U.S. Cl.
CPC ............ *H02M 3/158* (2013.01); *H02M 1/00* (2013.01); *H02M 3/157* (2013.01); *H02M 1/0016* (2021.05); *H04R 3/00* (2013.01)

(58) Field of Classification Search
CPC .... H02M 1/00; H02M 1/0003; H02M 1/0006; H02M 1/0016; H02M 1/0025; H02M 3/156; H02M 3/157; H02M 3/158; H04R 3/00; H04R 3/002
See application file for complete search history.

(56) References Cited

U.S. PATENT DOCUMENTS

| 5,894,243 | A | * | 4/1999 | Hwang | ............... H02M 3/1588 323/299 |
|---|---|---|---|---|---|
| 10,389,243 | B2 | | 8/2019 | Chakkirala | |
| 2005/0110474 | A1 | | 5/2005 | Ortiz et al. | |
| 2006/0043942 | A1 | | 3/2006 | Cohen | |
| 2014/0347027 | A1 | * | 11/2014 | Jayaraj | ............... H02M 3/1563 323/282 |
| 2016/0329734 | A1 | * | 11/2016 | Lee | ........................ H02M 3/156 |
| 2016/0352216 | A1 | | 12/2016 | Sonnaillon | |
| 2018/0262107 | A1 | * | 9/2018 | Raval | ..................... H02M 3/158 |
| 2022/0029541 | A1 | * | 1/2022 | Rosenbaum | .......... H03F 1/0227 |

OTHER PUBLICATIONS

International Search Report and Written Opinion PCT/US2022/070058 ISA/EPO—dated Apr. 8, 2022.

* cited by examiner

*Primary Examiner* — Matthew V Nguyen
(74) *Attorney, Agent, or Firm* — Patterson + Sheridan, L.L.P.

(57) ABSTRACT

An example power supply circuit includes a boost converter and a feedback control circuit. The boost converter generally includes an inductive element coupled between an input voltage node and a switching node, a first switch coupled between the switching node and a reference potential node, a second switch or a diode coupled between the switching node and an output voltage node. The feedback control circuit has a first input coupled to the output voltage node and has an output coupled to at least a control input of the first switch. The feedback control circuit generally includes a voltage node configured to influence a duty cycle of the boost converter; and a feedforward path coupled to the voltage node and configured to have a voltage signal derived from at least one of an input voltage at the input voltage node or an output signal at the output voltage node.

20 Claims, 6 Drawing Sheets

BOOST CONVERTER CIRCUIT WITH FEEDFORWARD PATH FOR IMPROVED LOAD REGULATION

TECHNICAL FIELD

Certain aspects of the present disclosure generally relate to electronic circuits and, more particularly, to a power supply circuit including a boost converter.

BACKGROUND

A voltage regulator ideally provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A linear regulator may be implemented by a low-dropout (LDO) regulator, for example. A switching regulator may be implemented by a switched-mode power supply (SMPS), such as a buck converter, a boost converter, a buck-boost converter, or a charge pump.

For example, a boost converter is a type of SMPS for stepping up voltage (and stepping down current) from the input to the output. A boost converter typically includes: (1) an inductor coupled between an input supply node and a switching node, (2) a switch coupled between the switching node and a reference potential node, (3) and another switch (or a diode) coupled between the switching node and a load (e.g., represented by a shunt capacitive element). The switches are typically implemented with power transistors.

A voltage regulator (e.g., a boost converter) may be controlled by (or at least a portion thereof may be included in) a power management integrated circuit (power management IC or PMIC). A PMIC may be used for managing the power requirement of a host system and may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

Certain aspects of the present disclosure generally relate to a boost converter circuit with a feedback control circuit (e.g., a current-mode feedback control circuit) and a feedforward path provided to the feedback control circuit. The feedforward path may be a combined feedforward-feedback path or a pure feedforward path, but for ease of description and to distinguish from the primary boost feedback loop (including the feedback control circuit), a hybrid or pure feedforward path is referred to herein as simply a "feedforward path."

Certain aspects of the present disclosure provide a power supply circuit. The power supply circuit includes a boost converter and a feedback control circuit. The boost converter generally includes an inductive element coupled between an input voltage node and a switching node, a first switch coupled between the switching node and a reference potential node, a second switch or a diode coupled between the switching node and an output voltage node. The feedback control circuit has a first input coupled to the output voltage node and has an output coupled to at least a control input of the first switch. The feedback control circuit generally includes a voltage node configured to influence a duty cycle of the boost converter; and a feedforward path coupled to the voltage node and configured to have a voltage signal derived from an output signal at the output voltage node.

Certain aspects of the present disclosure provide a power supply circuit. The power supply circuit includes a boost converter and a feedback control circuit. The boost converter generally includes an inductive element coupled between an input voltage node and a switching node, a first switch coupled between the switching node and a reference potential node, a second switch or a diode coupled between the switching node and an output voltage node. The feedback control circuit has a first input coupled to the output voltage node and has an output coupled to at least a control input of the first switch. The feedback control circuit generally includes a voltage node configured to influence a duty cycle of the boost converter; and a feedforward path coupled to the voltage node and configured to have a voltage signal derived from an input voltage at the input voltage node.

Certain aspects of the present disclosure provide a power supply circuit. The power supply circuit includes a boost converter and a feedback control circuit. The boost converter generally includes an inductive element coupled between an input voltage node and a switching node, a first switch coupled between the switching node and a reference potential node, a second switch or a diode coupled between the switching node and an output voltage node. The feedback control circuit has a first input coupled to the output voltage node and has an output coupled to at least a control input of the first switch. The feedback control circuit generally includes a first voltage node configured to influence a duty cycle of the boost converter; and a second voltage node coupled to the first voltage node and configured to have a voltage signal derived from a load power of the power supply circuit and an input voltage of the input voltage node. The load power may be based on an output current signal and an output voltage signal of the output voltage node.

Certain aspects of the present disclosure are directed to a method of supplying power. The method includes operating a boost converter to generate an output signal at an output node. The boost converter generally includes an inductive element coupled between an input node and a switching node, a first switch coupled between the switching node and a reference potential node, and a second switch or a diode coupled between the switching node and the output node. The method also includes controlling at least the first switch using a feedback control circuit having a first input coupled to the output node and having an output coupled to at least a control input of the first switch. The feedback control circuit includes a voltage node configured to influence a duty cycle of the boost converter and a feedforward path coupled to the voltage node. The method also includes deriving a voltage signal for the feedforward path from the output signal at the output node.

Certain aspects of the present disclosure are directed to a method of supplying power. The method includes operating a boost converter to generate an output signal at an output node. The boost converter generally includes an inductive element coupled between an input node and a switching node, a first switch coupled between the switching node and a reference potential node, and a second switch or a diode coupled between the switching node and the output node. The method also includes controlling at least the first switch using a feedback control circuit having a first input coupled to the output node and having an output coupled to at least a control input of the first switch. The feedback control circuit includes a voltage node configured to influence a duty cycle of the boost converter and a feedforward path coupled to the voltage node. The method also includes deriving a voltage signal for the feedforward path from an input voltage at the input node.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

The techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), Single Carrier Frequency Division Multiple Access (SC-FDMA), Time Division Synchronous Code Division Multiple Access (TD-SCDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11, IEEE 802.16, Long Term Evolution (LTE) (e.g., in TDD and/or FDD modes), or some other standards. A TDMA system may implement Global System for Mobile Communications (GSM) or some other standards. These various standards are known in the art.

Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCSs), personal digital assistants (PDAs), and the like.

Figure 1:
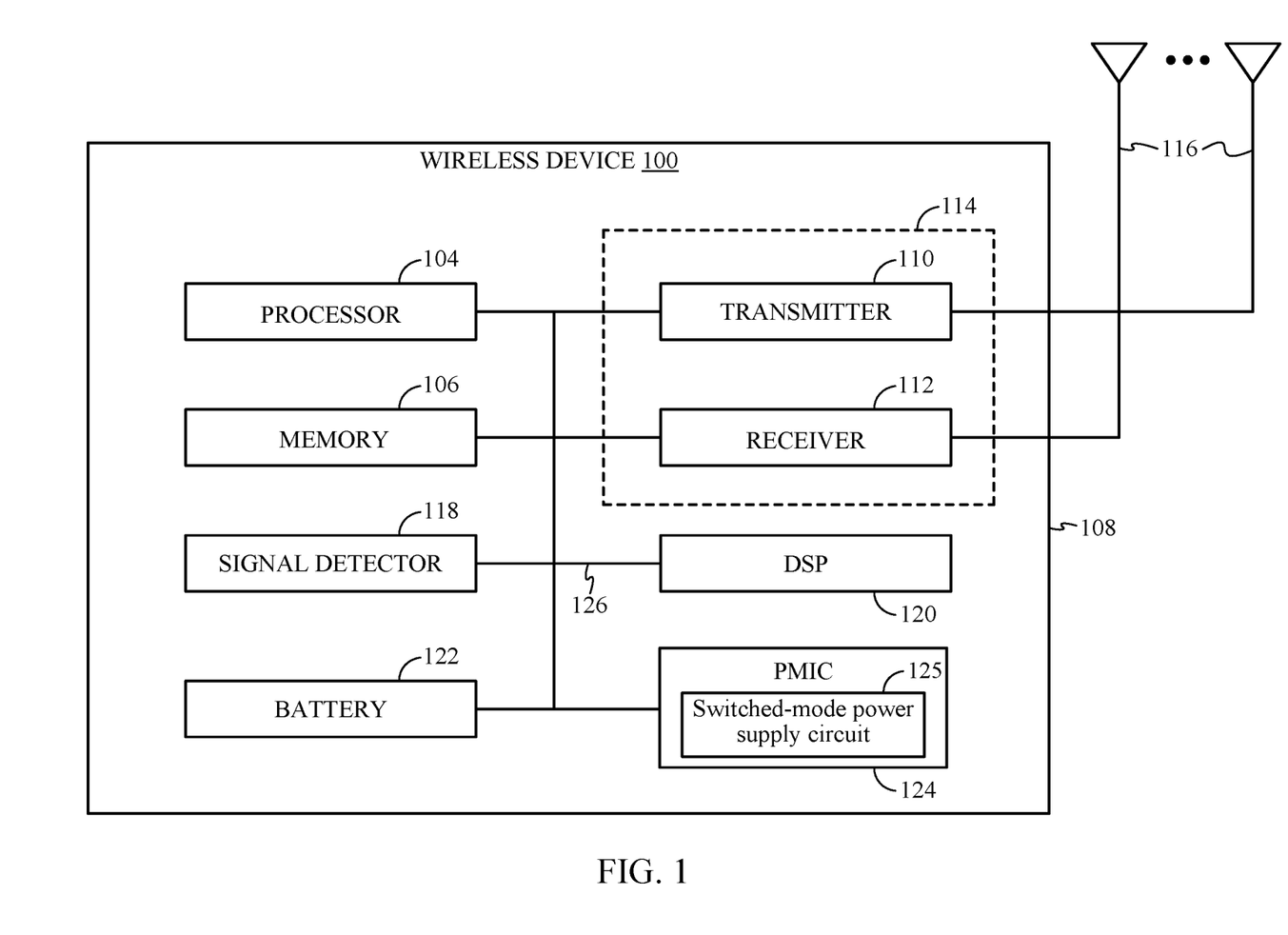
FIG. 1 illustrates a block diagram of an example device that includes a switched-mode power supply (SMPS) circuit, in accordance with certain aspects of the present disclosure.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, a wearable device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the PMIC 124 may include at least a portion of a power supply circuit, which may include a switched-mode power supply circuit 125. The switched-mode power supply circuit 125 may be implemented by any of various suitable switched-mode power supply circuit topologies, such as a boost converter. For certain aspects, the power supply circuit may include a boost converter circuit with a feedback control circuit and a feedforward signal generator, as described below.

The device 100 may additionally include one or more speakers (not shown) for transducing electrical signals into audio signals. In this case, the device 100 may include one or more amplifiers for driving the speaker(s), and these amplifiers may be powered by one or more power supply circuits, which may be part of the PMIC or receive power supply voltage rails generated by the PMIC.

The various components of the device 100 may be coupled together by a bus system 126, which may include a power bus, a control signal bus, and/or a status signal bus in addition to a data bus.

Example Audio System

A speaker is a transducer that produces a pressure wave in response to an input electrical signal, and thus, sound is generated. The speaker input signal may be produced by an audio amplifier that receives a relatively lower voltage analog audio signal and generates an amplified signal to drive the speaker. A dynamic loudspeaker is typically composed of a lightweight diaphragm (a cone) connected to a rigid basket (a frame) via a flexible suspension (often referred to as a "spider") that constrains a voice coil to move axially through a cylindrical magnetic gap. When the input electrical signal is applied to the voice coil, a magnetic field is created by the electric current in the coil, thereby forming a linear electric motor. By changing the electrical signal from the audio amplifier, the mechanical force generated by the interaction between the magnet and the voice coil is modulated and causes the cone to move back and forth, thereby creating the pressure waves interpreted as sound.

Figure 2:
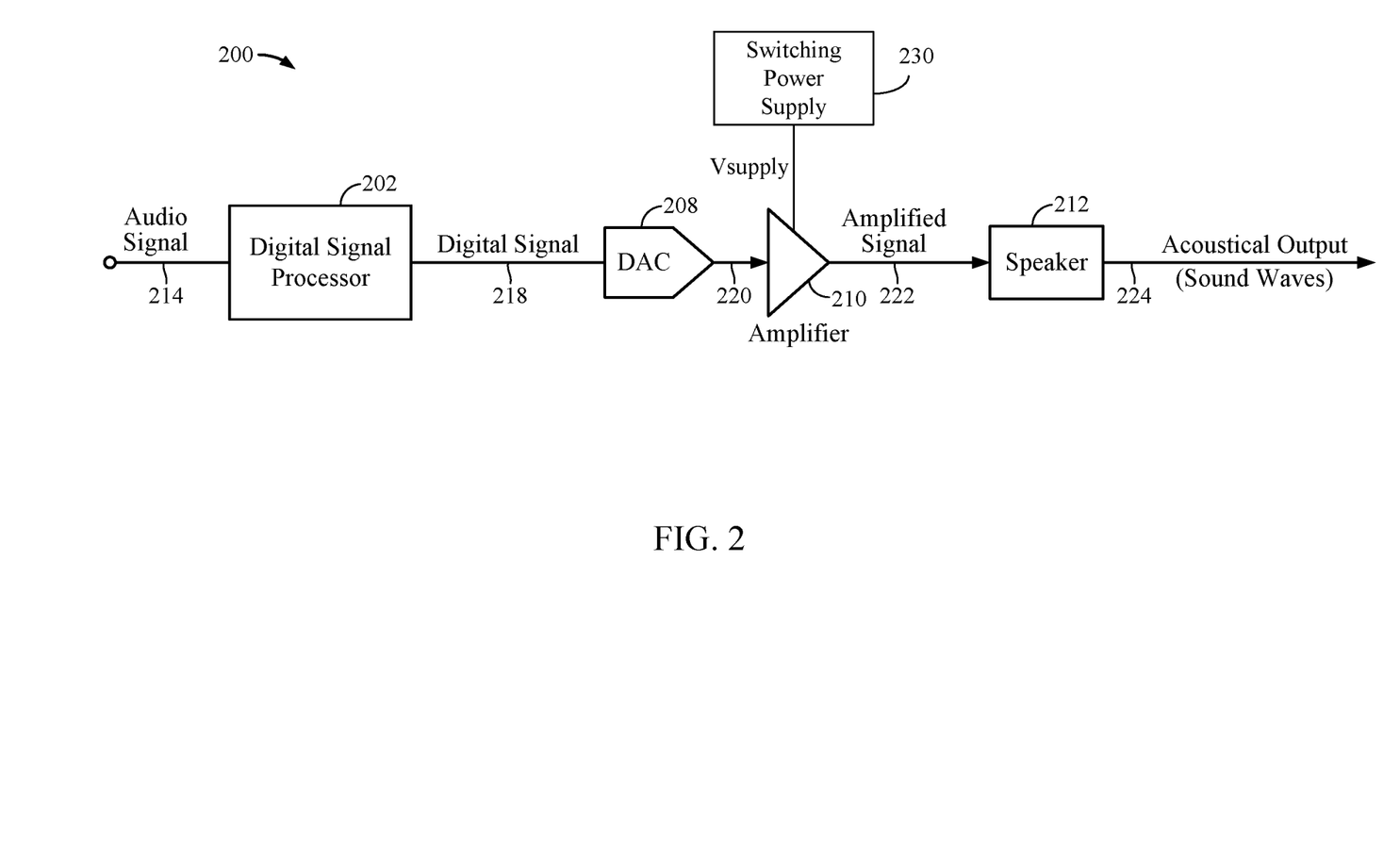
FIG. 2 is a block diagram of an example audio system, in accordance with certain aspects of the present disclosure.

FIG. 2 is a block diagram of an example audio system 200, in accordance with certain aspects of the present disclosure. The audio system 200 may be incorporated in any of various suitable devices, such as the device 100. As illustrated, a digital signal processor (DSP) 202 may receive and process audio signals 214 (e.g., a digital audio signal), for example, by applying a digital filter aimed at increasing audio quality and/or adjusting certain audio properties. The processed digital signal 218 produced by the DSP (or a further processed version thereof) may be converted to an analog signal 220 using a digital-to-analog converter (DAC) 208. In certain aspects, the DAC 208 may be implemented as part of the DSP 202. The analog signal 220 may be amplified using an amplifier 210 to generate the amplified signal 222. For example, the amplifier 210 may be a switching amplifier, such as a class-D amplifier. The amplified signal 222 may drive a speaker 212 to produce an acoustic output 224 (e.g., sound waves). A power supply voltage ($V_{supply}$) for the amplifier 210 may be generated by a switching power supply 230 (e.g., a switched-mode power supply, such as the SMPS 125).

Example Boost Converter Circuit with Feedback Control and a Feedforward Path

Figure 3A:
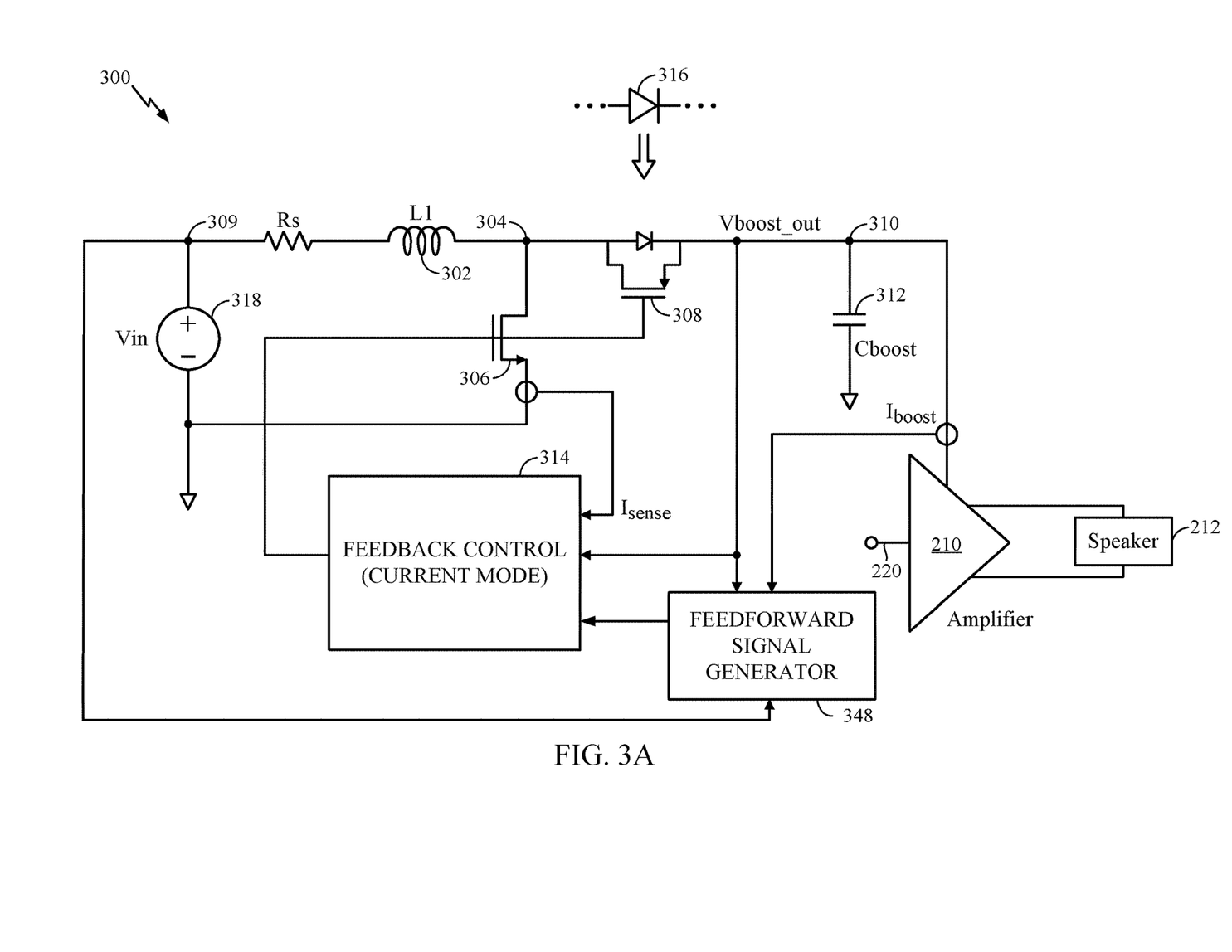
FIG. 3A is a block diagram of an example power supply circuit comprising a boost converter, a feedback control circuit, and a feedforward signal generator, in accordance with certain aspects of the present disclosure.
Figure 3B:
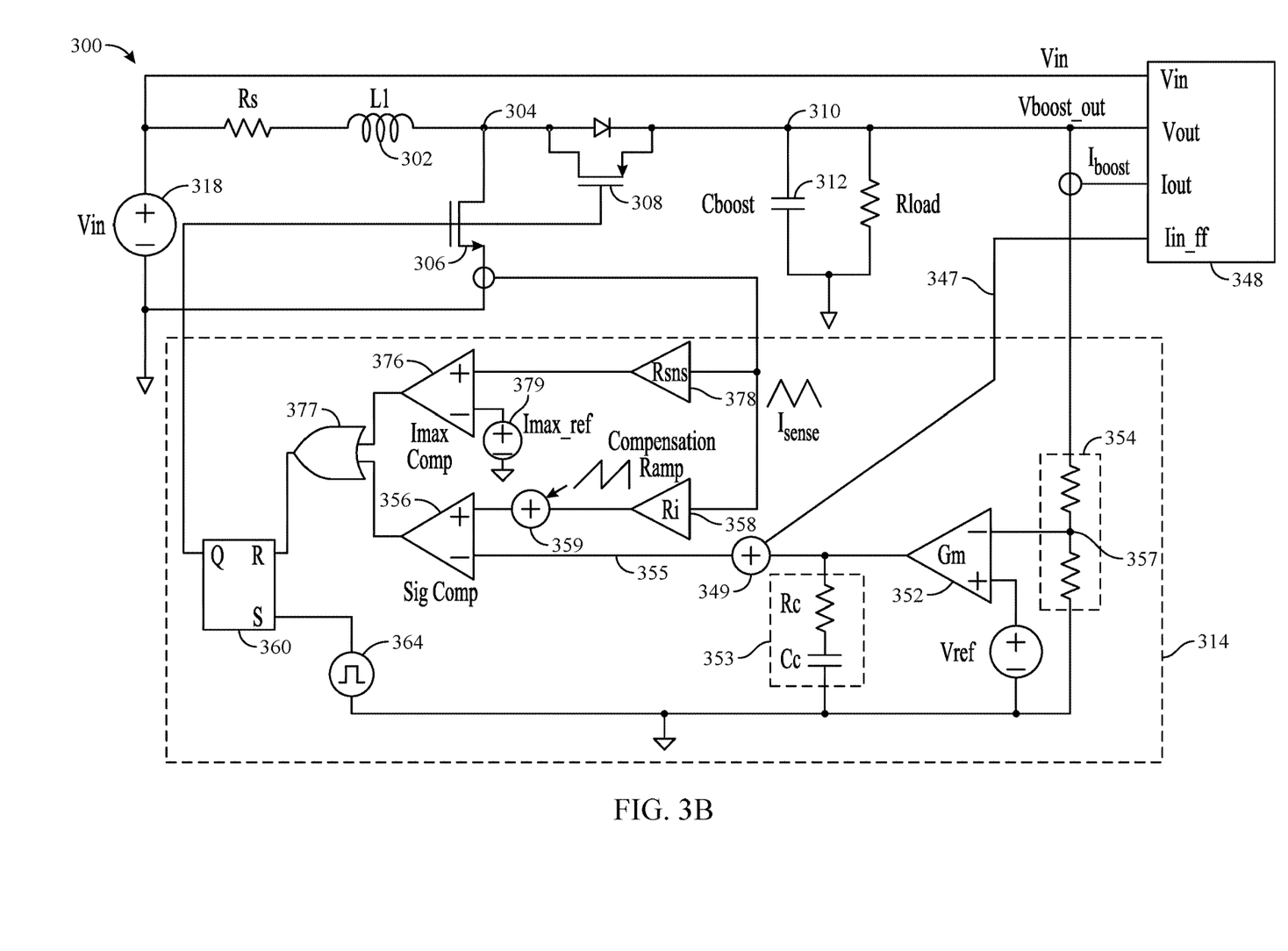
FIG. 3B illustrates an example implementation of the feedback control circuit and feedforward signal generator of FIG. 3A, in accordance with certain aspects of the present disclosure.

FIG. 3A illustrates an example power supply circuit 300 (also referred to herein as a "boost converter circuit"), in accordance with certain aspects of the present disclosure. The power supply circuit 300 is implemented with a boost converter, which includes an inductive element 302 (e.g., inductor L1) and a switch 306, both coupled to a node 304 (also referred to as the "switching node"). The power supply circuit 300 also includes a switch 308 coupled between the node 304 and an output node 310 of the boost converter. Switch 306 and/or switch 308 may each be implemented by one or more transistors, which may be n-type field-effect transistors (NFETs) or p-type field-effect transistors (PFETs), as illustrated in FIG. 3A. For example, although switch 308 is depicted in FIG. 3A as being implemented by a PFET, the reader is to understand that switch 308 may be implemented as an NFET in other aspects, in which case the gate drive polarity may be reversed. The output node 310 may be coupled to an energy storage device (e.g., a capacitive element 312, such as capacitor $C_{boost}$) and a load, which is represented in FIG. 3A by an amplifier (e.g., the amplifier 210) and is represented in FIG. 3B by a resistor $R_{load}$.

Switch 306 may be controlled by a pulse-width modulation (PWM) signal to open and close switch 306 in an effort to regulate a voltage across the capacitive element 312 (i.e., the voltage $V_{boost\_out}$ at the output node 310). For example, during a first period, switch 306 may be closed, transferring energy from an input voltage source 318 (having voltage $V_{in}$ at input node 309 and series resistance $R_s$) and storing the energy in the inductive element 302. Switch 306 may be opened during a second period, transferring the energy stored in the inductive element 302 through switch 308 to the capacitive element 312. In certain aspects, switch 308 may be replaced with a diode 316, and the energy stored in the inductive element 302 may be transferred to the capacitive element 312 via the diode 316.

As illustrated, the power supply circuit 300 also includes a current-mode feedback control circuit 314, having an input coupled to output node 310 and having an output coupled to the control input of switch 306 (and in some cases, to switch 308). The feedback control circuit 314 may control switch 306 and, in some cases, also switch 308 based on both the voltage $V_{boost\_out}$ at the output node 310 and a current through switch 306. For example, the feedback control circuit 314 may receive a current sense signal $I_{sense}$ that is representative of the current through switch 306. $I_{sense}$ also represents the current through the inductive element 302 during the first period when switch 306 is closed. However, in some cases, the feedback control circuit 314 may directly sense the current through the inductive element 302. Based on $I_{sense}$ and $V_{boost\_out}$, the feedback control circuit 314 may control the current through inductive element 302 by controlling the duty cycle of the PWM signal used to drive switch 306 (and switch 308).

A PWM signal with a relatively high duty cycle may lead to stability challenges for the power supply circuit 300, due to a right-hand plane zero of the power supply circuit moving close to zero for higher duty cycle. To make the feedback loop stable, bandwidth may be sacrificed. It is also typically desirable in audio applications to deliver power to the amplifier (e.g., amplifier 210) with good load regulation, ensuring there are no issues with frequencies up to about 20 kHz. However, relatively higher frequencies may lead to increased ripple in the voltage $V_{boost\_out}$ at the output node 310, especially at higher power loads, and increased ripple may cause greater distortion in the amplifier. That is, once headroom in the power supply voltage for the amplifier is not maintained, distortion may be enhanced.

Certain aspects of the present disclosure provide a combined feedforward-feedback signal (or, in some cases, a pure feedforward signal) to the feedback control circuit 314, so that the feedback loop need not support the higher frequency load. For ease of description, the combined feedforward-feedback signal and the pure feedforward signal are generally referred to herein simply as a "feedforward signal." By providing such a feedforward signal to the feedback control circuit 314, the feedforward signal may improve load regulation for the power supply circuit 300. For certain aspects, the feedforward signal may have and/or may be based on information of the load power (i.e., the output voltage $V_{boost\_out}$ and the load current). As illustrated in FIG. 3A, the feedforward signal may be generated by a feedforward signal generator 348 (a combined feedforward-feedback signal generator or a pure feedforward signal generator) and supplied to the feedback control circuit 314 via a feedforward path 347 (a combined feedforward-feedback path or a pure feedforward path, according to the type of signal generator).

The system in which the power supply circuit is used (e.g., the device 100) knows the input signal (e.g., an audio signal or a sinusoidal signal) to the amplifier 210. The feedforward signal generator 348 may be provided with the voltage $V_{boost\_out}$ at the output node 310 and the load current ($I_{boost}$), which may be sensed along the path between switch 308 and the power supply terminal of the amplifier 210 in the case of active load current monitoring, as shown in FIG. 3A. The feedforward signal generator 348 may also receive the voltage $V_{in}$ at input node 309. With these signals and by assuming an efficiency of the boost converter, the feedforward signal generator 348 can calculate the input current ($I_{in}$) and generate a feedforward signal ($I_{in\_ff}$) based thereon. For certain aspects, the feedforward signal may be proportional to the input current ($I_{in\_ff} \propto I_{in}$), where the input current is the current from the input voltage source 318. Because the input current is an estimated current, the feedforward signal may follow the input current expected based on load current.

Although the feedback loop for the power supply circuit 300 may be somewhat slow to respond to changes in the load power, providing the feedforward signal via the feedforward path 347 to the feedback control circuit 314 may lead to smaller voltage ripple in the output voltage $V_{boost\_out}$ and, in turn, lower distortion of the amplifier 210.

FIG. 3B illustrates an example implementation of the feedback control circuit 314 and the feedforward signal generator 348 of FIG. 3A, in accordance with certain aspects of the present disclosure. As illustrated, the feedback control circuit 314 includes an amplifier 352 (e.g., a transconductance (Gm) amplifier) coupled to a tap 357 of a voltage divider 354. The voltage divider 354 is used to scale down the voltage $V_{boost\_out}$. Thus, the amplifier 352 may compare the scaled-down voltage at the tap 357 to a reference voltage source (labeled "$V_{ref}$") and generate an output current. The output of the amplifier 352 may be coupled to an impedance 353 to convert the output current of the amplifier 352 to a voltage. In certain aspects, the impedance 353 may be implemented using a resistor $R_c$ connected in series with a capacitor $C_c$, as illustrated in FIG. 3B.

The output of the amplifier 352 may also be coupled to an input of a combiner 349 (e.g., a voltage summer). Another input of the combiner 349 may be coupled to the feedforward path 347 for receiving a feedforward signal (e.g., a voltage signal representative of $I_{in\_ff}$) from the feedforward signal generator 348. The combiner 349 may be configured to sum or otherwise combine the signals from the feedforward signal generator 348 and the amplifier 352 and provide the combined signal at node 355 (e.g., a voltage node). The voltage at node 355 may influence the duty cycle of the boost converter.

The feedback control circuit 314 may also include a comparator 356 (e.g., a signal comparator), and node 355 couples an output of the combiner 349 with an input of a comparator 356. The comparator 356 is configured to receive a signal representative of $I_{sense}$ for comparison to the combined voltage at the output of the combiner 349. For example, the current $I_{sense}$ may be converted to a current sense voltage via a current-sensing circuit 358 (e.g., which may include a current-to-voltage converter, labeled "$R_i$"). In certain aspects, a compensation ramp signal may be combined with (e.g., added to) the current sense voltage for slope compensation and to stabilize the current loop feedback.

For certain aspects, the feedback control circuit 314 includes a comparator 376 (e.g., a maximum current ($I_{max}$) comparator) and a voltage source 379 configured to produce a maximum current reference voltage ($I_{max\_ref}$). The comparator 376 may be configured to receive a signal representative of $I_{sense}$ for comparison to the maximum current reference voltage. For example, the current $I_{sense}$ may be converted to a current sense voltage via a current-sensing circuit 378 (e.g., which may include a current-to-voltage converter, labeled "$R_{sns}$"). In this manner, the comparator 376 may effectively output a logical high signal if the sensed current ($I_{sense}$) is greater than a threshold current.

In certain aspects, the feedback control circuit 314 also includes a flip-flop 360 (e.g., a set-reset (SR) flip-flop) for outputting the PWM signal at output Q to control switch 306 (and switch 308). For example, the set (S) input of the flip-flop 360 may be coupled to a pulse generator 364, and the reset (R) input of the flip-flop 360 may be coupled to the output of a logical OR gate 377, having inputs coupled to the outputs of the comparator 356 and the comparator 376. The pulse generator 364 may generate a pulse signal for driving the S input of the flip-flop 360. The pulse signal may have a periodic waveform with about a 1 to 2% duty cycle, for example. In this manner, the duty cycle of the PWM signal output by the flip-flop 360 is controlled based on $I_{sense}$, $V_{boost\_out}$, and $I_{in\_ff}$, and with this information about the load power, the voltage ripple of the output boost voltage $V_{boost\_out}$ may be decreased, leading to better load regulation for the power supply circuit 300 without compromising on feedback loop stability.

Figure 3C:
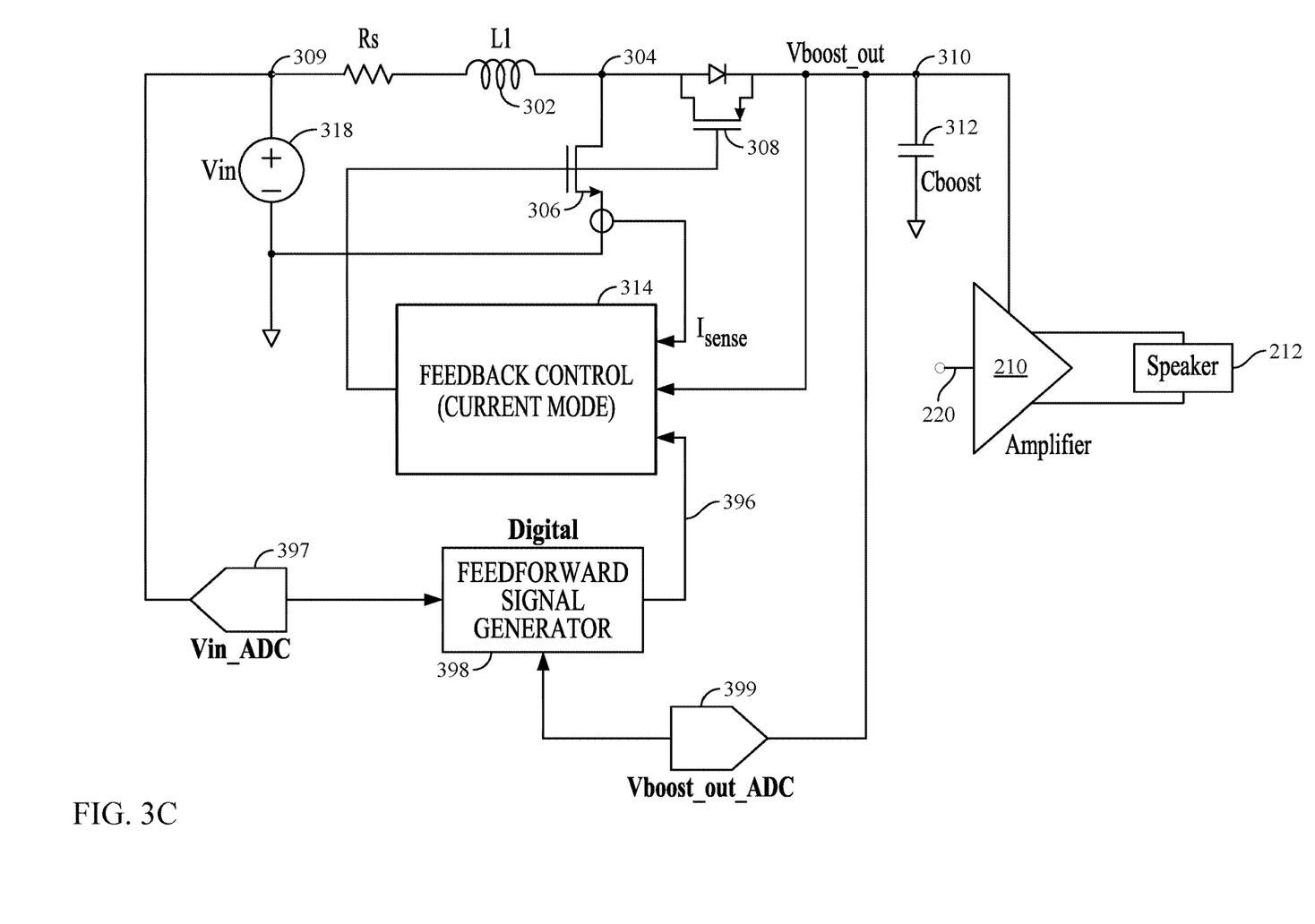
FIG. 3C is a block diagram of another example power supply circuit comprising a boost converter, a feedback control circuit, and a feedforward signal generator, in accordance with certain aspects of the present disclosure.

For other aspects, the feedforward signal generator may be implemented in the digital domain, and the feedforward signal may be generated based on estimates of the boost converter output and speaker output power. For example, FIG. 3C is a block diagram of a power supply circuit 390, which is similar to the power supply circuit 300 illustrated in FIG. 3A, but includes a feedforward signal generator 398 operating in the digital domain. The power supply circuit 390 also includes an analog-to-digital converter (ADC) 397 (labeled "Vin_ADC") for converting analog voltage $V_{in}$ to a digital signal and an ADC 399 (labeled "Vboost_out_ADC") for converting analog voltage $V_{boost\_out}$ to a digital signal, both received by the feedforward signal generator 398.

As shown in FIG. 3C, the input of the ADC 397 is coupled to the input voltage source 318, and the output of the ADC 397 is coupled to the feedforward signal generator 398. The input of the ADC 399 is coupled to the output node 310, and the output of the ADC 399 is coupled to the feedforward signal generator 398. The output of the feedforward signal generator 398 is coupled to an input of the feedback control circuit 314 via a feedforward path 396 (a combined feedforward-feedback path or a pure feedforward path). In this instance, the load current ($I_{boost}$) need not be provided to the feedforward signal generator 398.

As described above, the system in which the power supply circuit 390 is used (e.g., the device 100) knows the input signal (e.g., an audio signal or a sinusoidal signal) to the amplifier 210. For example, the feedforward signal generator 398 may be provided with information related to the signal being played at the speaker output. Furthermore, instead of sensing the load current ($I_{boost}$), the system may also have information related to the load (e.g., the audio output), such as the load current and/or the speaker impedance (e.g., 4Ω or 8Ω). The feedforward signal generator 398 may use this information combined with the digital representations of voltages $V_{in}$ and $V_{boost\_out}$ from the ADCs 397, 399 to generate the feedforward signal on the feedforward path 396.

For certain aspects, the ADC 399 for providing a digital representation of the output voltage $V_{boost\_out}$ may be eliminated from the power supply circuit. The system may already know the setpoint for the output voltage (e.g., voltage $V_{boost\_out\_ref}$, which may correspond to the reference voltage source (labeled "$V_{ref}$") in FIG. 3B), which can be used instead of the sensed version of voltage $V_{boost\_out}$. In this case, the feedforward signal generator 398 generates a signal based on the input voltage $V_{in}$, which is a pure feedforward implementation.

Example Operations for Supplying Power

Figure 4:
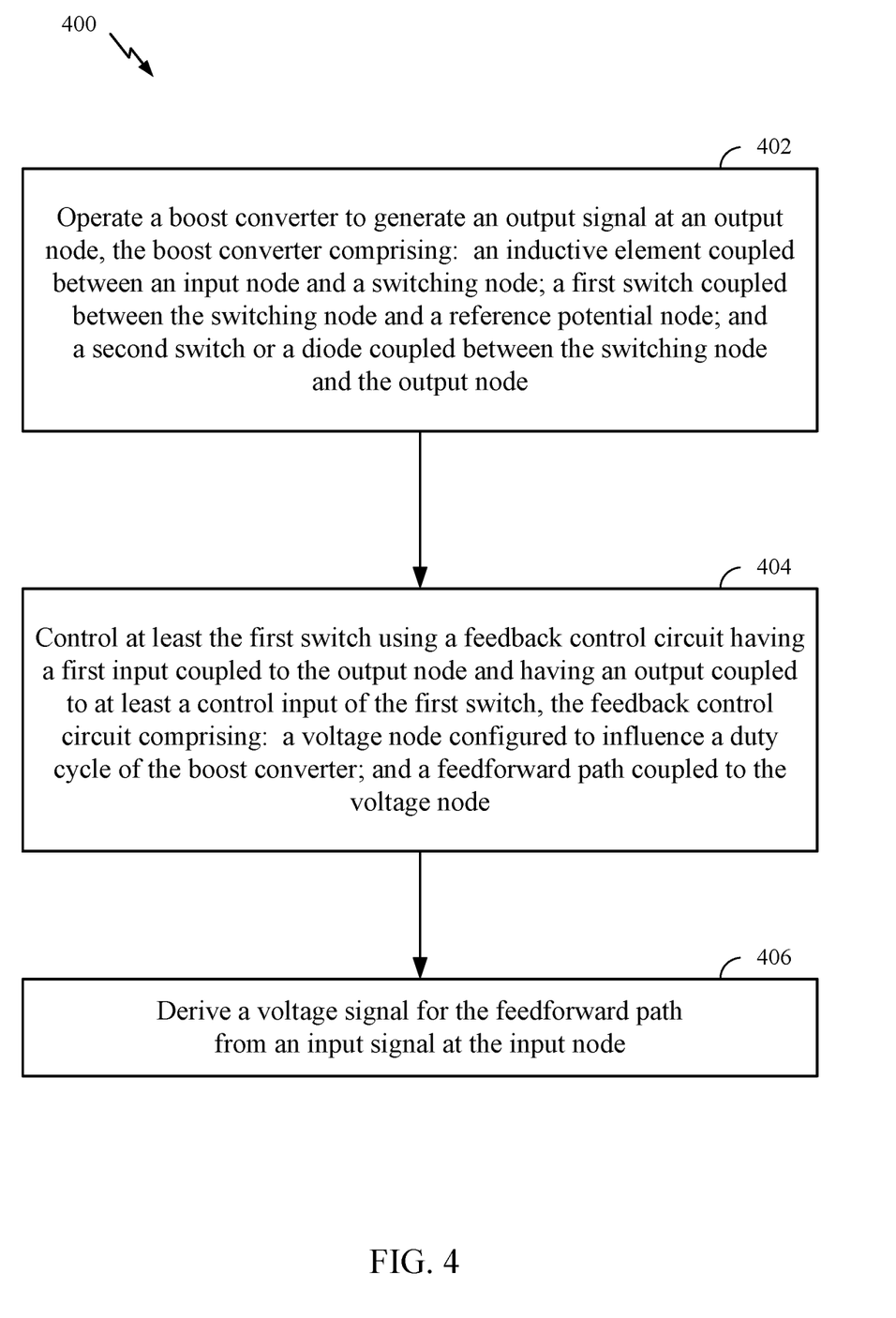
FIG. 4 is a flow diagram of example operations for supplying power, in accordance with certain aspects of the present disclosure.

FIG. 4 is a flow diagram of example operations 400 for that may be performed by a power supply circuit (e.g., the power supply circuit 300 or 390), in accordance with certain aspects of the present disclosure.

The operations 400 may begin, at block 402, by operating a boost converter (e.g., the boost converter of FIGS. 3A-3C) to generate an output signal (e.g., $V_{boost\_out}$) at an output node (e.g., output node 310). The boost converter generally includes an inductive element (e.g., inductor L1) coupled between an input node (e.g., input node 309) and a switching node (e.g., node 304), a first switch (e.g., switch 306) coupled between the switching node and a reference potential node (e.g., electrical ground), and a second switch (e.g., switch 308) or a diode (e.g., diode 316) coupled between the switching node and the output node.

At block 404, a feedback control circuit (e.g., feedback control circuit 314) may be used to control at least the first switch. The feedback control circuit has a first input coupled to the output node and has an output coupled to at least a control input (e.g., the gate) of the first switch. The feedback control circuit includes a voltage node (e.g., node 355) configured to influence a duty cycle of the boost converter and a feedforward path (e.g., feedforward path 347 or feedforward path 396) coupled to the voltage node.

At block 406, the power supply circuit may derive a voltage signal (e.g., $I_{in\_ff}$) for the feedforward path from an input voltage at the input node. For certain aspects, the power supply circuit may derive the voltage signal from the input voltage at the input node and from the output signal at the output node (or based on a reference signal or setpoint for the output signal).

Certain aspects of the present disclosure generally relate to a boost converter circuit for supplying power to an amplifier (e.g., a class-D switching amplifier). The boost converter circuit has a voltage node (e.g., node 355) used to influence the duty cycle of the boost converter. Coupled to the voltage node is a feedforward path (e.g., feedforward path 347) with a voltage signal ($I_{in\_ff}$), which may be derived from the power supply signal provided to the amplifier. Although certain aspects of the present disclosure are explained with respect to a boost converter powering an amplifier for driving a speaker, the reader is to understand that certain aspects of the present disclosure may be used in other implementations where a boost converter powers a different load and where either the load current may be tapped or estimated in the digital domain.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of user equipment (UE), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A power supply circuit comprising:
   a boost converter comprising:
      an inductive element coupled between an input voltage node and a switching node;
      a first switch coupled between the switching node and a reference potential node; and
      a second switch or a diode coupled between the switching node and an output voltage node; and
   a feedback control circuit having a first input coupled to the output voltage node, having a second input configured to sense a current through the first switch, and having an output coupled to at least a control input of the first switch, the feedback control circuit comprising:
      a voltage node configured to influence a duty cycle of the boost converter;
      a feedforward path coupled to the voltage node and configured to have a voltage signal derived from an input voltage at the input voltage node;
      a combiner having an output coupled to the voltage node and having a first input coupled to the feedforward path, such that the feedforward path is coupled to the voltage node via the combiner; and
      a first comparator having a first input coupled to the second input of the feedback control circuit and having a second input coupled to the output of the combiner.

2. The power supply circuit of claim 1, wherein the voltage signal is derived from the input voltage at the input voltage node and an output signal of the output voltage node.

3. The power supply circuit of claim 1, wherein the voltage signal is derived from a load power and the input voltage at the input voltage node, the load power being based on an output current signal and an output voltage signal of the output voltage node.

4. The power supply circuit of claim 1, wherein the feedback control circuit further comprises:
   a flip-flop having a first input coupled to an output of the first comparator and having an output coupled to the control input of the first switch.

5. The power supply circuit of claim 4, wherein:
   the flip-flop comprises a set-reset flip-flop having a reset input as the first input and having a set input as a second input of the flip-flop; and
   the feedback control circuit further comprises a pulse generator coupled between the set input of the set-reset flip-flop and the reference potential node.

6. The power supply circuit of claim 4, wherein the feedback control circuit further comprises:
   a second comparator having a first input coupled to the second input of the feedback control circuit and having a second input coupled to another reference voltage source; and a logical OR gate having a first input coupled to an output of the second comparator, having a second input coupled to the output of the first comparator, and having an output coupled to the first input of the flip-flop.

7. The power supply circuit of claim 1, wherein the voltage signal is proportional to an input current through the inductive element.

8. The power supply circuit of claim 1, wherein the feedback control circuit further comprises:
a transconductance amplifier having a first input coupled to the output voltage node, having a second input coupled to a reference voltage source, and having an output coupled to a second input of the combiner; and
an impedance coupled between the output of the transconductance amplifier and the reference potential node.

9. The power supply circuit of claim 8, wherein the feedback control circuit further comprises a voltage divider coupled between the output voltage node and the reference potential node, wherein a tap of the voltage divider is coupled to the first input of the transconductance amplifier.

10. The power supply circuit of claim 8, wherein the impedance comprises a resistor and a capacitor connected in series.

11. A power supply circuit, comprising:
a boost converter comprising:
an inductive element coupled between an input voltage node and a switching node;
a first switch coupled between the switching node and a reference potential node; and
a second switch or a diode coupled between the switching node and an output voltage node; and
a feedback control circuit having an input coupled to the output voltage node and having an output coupled to at least a control input of the first switch, the feedback control circuit comprising:
a voltage node configured to influence a duty cycle of the boost converter;
a feedforward path coupled to the voltage node and configured to have a voltage signal derived from an input voltage at the input voltage node;
a combiner having an output coupled to the voltage node and having a first input coupled to the feedforward path, such that the feedforward path is coupled to the voltage node via the combiner;
a transconductance amplifier having a first input coupled to the output voltage node, having a second input coupled to a reference voltage source, and having an output coupled to a second input of the combiner; and
an impedance coupled between the output of the transconductance amplifier and the reference potential node.

12. The power supply circuit of claim 11, wherein the feedback control circuit further comprises a voltage divider coupled between the output voltage node and the reference potential node, wherein a tap of the voltage divider is coupled to the first input of the transconductance amplifier.

13. The power supply circuit of claim 11, wherein the impedance comprises a resistor and a capacitor connected in series.

14. A method of supplying power, the method comprising:
operating a boost converter to generate an output signal at an output node, the boost converter comprising:
an inductive element coupled between an input node and a switching node;
a first switch coupled between the switching node and a reference potential node; and
a second switch or a diode coupled between the switching node and the output node;
controlling at least the first switch using a feedback control circuit having a first input coupled to the output node, having a second input configured to sense a current through the first switch, and having an output coupled to at least a control input of the first switch, the feedback control circuit comprising:
a voltage node configured to influence a duty cycle of the boost converter; and
a feedforward path coupled to the voltage node;
deriving a voltage signal for the feedforward path from an input voltage at the input node; and
combining the voltage signal for the feedforward path with a feedback signal using a combiner of the feedback control circuit, wherein the combiner has an output coupled to the voltage node and has a first input coupled to the feedforward path, and wherein the feedback control circuit further comprises a comparator having a first input coupled to the second input of the feedback control circuit and having a second input coupled to the output of the combiner.

15. The method of claim 14, wherein the deriving comprises deriving the voltage signal from the input voltage at the input node and from the output signal at the output node.

16. The method of claim 14, wherein the deriving comprises deriving the voltage signal from a load power and from the input voltage at the input node, the load power being based on an output current signal and an output voltage signal of the output node.

17. The method of claim 14, wherein the voltage signal is proportional to an input current through the inductive element.

18. The method of claim 14, further comprising:
amplifying a portion of the output signal with a transconductance amplifier having a first input coupled to the output node, having a second input coupled to a reference voltage source, and having an output coupled to a second input of the combiner; and
converting a current signal output from the transconductance amplifier to the feedback signal using an impedance coupled between the output of the transconductance amplifier and the reference potential node.

19. The method of claim 18, further comprising voltage dividing the output signal to generate the portion of the output signal using a voltage divider coupled between the output node and the reference potential node, wherein a tap of the voltage divider is coupled to the first input of the transconductance amplifier.

20. The method of claim 18, wherein the impedance comprises a resistor and a capacitor connected in series.

* * * * *